United States Patent
Van Den Meersche

(10) Patent No.: US 6,237,247 B1
(45) Date of Patent: May 29, 2001

(54) APPARATUS AND METHOD FOR A SPRAY DRYER

(75) Inventor: Jan Van Den Meersche, Blaasveld (BE)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 0 days.

(21) Appl. No.: 09/091,068

(22) PCT Filed: Dec. 2, 1996

(86) PCT No.: PCT/EP96/05339

§ 371 Date: Jun. 9, 1998

§ 102(e) Date: Jun. 9, 1998

(87) PCT Pub. No.: WO97/21477

PCT Pub. Date: Jun. 19, 1997

(30) Foreign Application Priority Data

Dec. 9, 1995 (DE) .............................. 195 45 986

(51) Int. Cl.[7] ..................................... F26B 3/08
(52) U.S. Cl. .................. 34/363; 34/372; 34/374; 34/583; 34/68; 34/174
(58) Field of Search ............... 34/363, 372, 374, 34/583, 585, 68, 174; 432/95, 99, 135, 200, 113, 117

(56) References Cited

U.S. PATENT DOCUMENTS

| | | |
|---|---|---|
| 3,633,283 | 1/1972 | Mishkin et al. . |
| 3,740,865 | 6/1973 | Laguilharre . |
| 4,809,442 | * 3/1989 | Iwaya et al. . |
| 5,556,274 | * 9/1996 | Ettie et al. ........................ 432/159 |

FOREIGN PATENT DOCUMENTS

| | | |
|---|---|---|
| 380 028 | 8/1964 | (CH) . |
| 0 227 486 | 7/1987 | (EP) . |
| 2 080 016 | 11/1971 | (FR) . |
| 805 114 | 11/1958 | (GB) . |
| 898 316 | 10/1960 | (GB) . |
| 5-285301 | 11/1993 | (JP) . |

OTHER PUBLICATIONS

PCT WO 93/23129, Method & Apparatus for Minimizing Deposits in a Drying Chamber, World Intellectual Property Org. Nov. 1993.

* cited by examiner

Primary Examiner—Pamela Wilson
(74) Attorney, Agent, or Firm—Wayne C. Jaeschke; Glenn E.J. Murphy

(57) ABSTRACT

A spray dryer apparatus and method suitable for the production of detergents, cleaners and components thereof wherein the inner wall of the drying chamber is provided with an air-permeable textile material lining at a distance from the inner wall, and at least one outlet for compressed gas is provided between the inner wall and the textile material lining whereby adherence of sticky deposits on the inner wall of the drying chamber is avoided or reduced.

20 Claims, 3 Drawing Sheets

APPARATUS AND METHOD FOR A SPRAY DRYER

BACKGROUND OF THE INVENTION

1. Field of the Invention

This invention relates to a spray dryer which is particularly suitable for the production of detergents and/or cleaners and components thereof and which comprises a drying chamber, at least one spraying element for introducing the material to be spray-dried into the chamber and means for introducing a heated gas into the chamber in co-current or countercurrent to the descending spray-dried material.

2. Discussion of Related Art

Spray dryers of the type in question are known. They are used on an industrial scale for the production of powder-form detergents or cleaners and components thereof known as "tower powders". In these spray dryers, a coherent liquid mass or slurry is divided up by nozzles into small droplets which are then dried by a hot air stream flowing in countercurrent to the descending droplets, the liquid suddenly evaporating.

Spray drying in the production of detergents/cleaners is characterized on the one hand by the relatively high temperature of the drying gas used which can exceed 300° C. On the other hand, the material to be dried generally contains a large percentage of organic ingredients, more particularly surfactants, which are not only temperature-sensitive, they also tend to carbonize and self-ignite at the high temperatures prevailing in the spray dryer if the product remains in the drying chamber for longer than a few seconds.

Accordingly, in the production of detergents/cleaners and components thereof, it is important that the material to be spray-dried pass through the spray dryer relatively quickly and, in particular, be rapidly discharged from the dryer.

Unfortunately, some of the material to be spray-dried is inevitably deposited onto the inner walls of the drying chamber where it gradually heats up, dries out completely and, after a certain time, becomes so hard that it is extremely difficult to remove.

These deposits are formed in particular in the production of detergents/cleaners because the only partly dried-on particles, which are rich in surfactants, have a very tacky surface. In addition, black product particles are formed by carbonization and contaminate the tower powder so that it no longer meets consumer quality requirements.

To solve the problems caused by hard deposits, carbonization and the risk of fire, operation of the spray dryer for the production of detergents/cleaners and components thereof is interrupted at regular intervals for the purpose of cleaning the inner walls of the chamber.

The problems mentioned above occur to a greater extent with modern detergent formulations which contain particularly large amounts of surfactants. To prevent deposits formed on the inner walls of the spray-drying chamber from burning, not only is operation of the dryer regularly interrupted, the temperatures of the hot gas are also lowered. As a result, the performance of the spray dryer diminishes.

The deposits are formed all over the inner wall of the drying chamber, but especially in the lower region thereof which, generally, tapers conically downwards. The inclination of the inner walls in this cone leads to increased deposits which, moreover, become particularly hot in this region because the hot drying gas enters the drying chamber in the vicinity of the tower cone.

Although the deposits could conceivably be removed by externally mounted knockers, the resulting deformation of the tower cone would result in damage to the surface and in unevenness in the inner wall which in turn would result in increased deposits. Other disadvantages include the noise generated, the uncontrolled cleaning and the difficulties involved in removing particularly hard deposits.

Accordingly, the problem addressed by the present invention was significantly to ease the problems caused by deposits, carbonization and the risk of fire in a spray dryer of the type mentioned at the beginning. In addition, the operational interruptions for cleaning the inner walls of the drying chamber would only be necessary at very much longer time intervals.

DESCRIPTION OF THE INVENTION

According to the invention, the solution to this problem in a spray dryer of the type mentioned at the beginning is characterized in that at least part of the inner wall of the drying chamber is lined with an air-permeable textile at a distance from the chamber wall and at least one outlet for compressed gas, more particularly compressed air, is provided between the chamber wall and the textile. In a preferred embodiment, the lower part of the inner wall and/or the inner wall in the vicinity of the spraying elements and/or the inner wall below this region is/are lined with the textile.

The particles adhering to the inner walls of the spray dryer according to the invention are deposited onto the air-permeable textile which can be cleaned simply and effectively from the back by exposure to a pulse of the compressed gas. When cleaned in this way, the textile expands and adhering particles fly off and are blown into the interior of the drying chamber. There is no longer any need to interrupt the operation of the dryer to clean the walls.

Another advantage lies in the increased performance of the spray dryer according to the invention because the product contains fewer agglomerates which, hitherto, would have been removed as oversize particles by sieving. The absence of deposits according to the invention reduces the risk of fire and allows higher temperatures for the hot gas so that the performance of the spray dryer can be increased.

The gas used for cleaning may be compressed air. However, inert gases, for example nitrogen, combustion gases or the gas used for drying, for example hot air or superheated steam, may also be used.

Since the problems mentioned at the beginning occur to a greater extent in a downwardly tapering drying chamber, the cone is lined with the air-permeable textile in a particularly preferred embodiment of the invention.

The air-permeable textile lining according to the invention is advantageous for all regions of the inner wall of the drying chamber where the product is preferentially deposited. Thus, in another advantageous embodiment of the spray dryer according to the invention of which the spraying elements are arranged in at least two horizontal planes, the inner wall of the drying chamber is lined with the textile in the region between the planes and/or below the planes. In this region, the sprayed droplets still contain a relatively large amount of liquid, particularly water, and accordingly have a particularly pronounced tendency to adhere to the inner wall of the drying chamber.

Woven fabrics combining high heat resistance with high tensile strength are particularly suitable as the textile. The high tensile strength enables the textile to be cleaned with relatively high gas pressures. In one particular embodiment, the textile is a fabric of high-modulus fibers, more particularly polyamide and preferably aramide fibers. High-modulus fibers such as these are heat-resistant and non-inflammable. They possess very high strength and glass and decomposition temperatures of >400° C. and are therefore particularly suitable for use in spray dryers which are used for the production of detergents/cleaners and components thereof and, accordingly, operate with particularly hot drying gases. High-strength textiles of the type in question advantageously accommodate a relatively high pressure of the gas for cleaning the textile of up to 10 bar and, more particularly, from 3 to 8 bar.

The scope of the present invention encompasses various embodiments of the spray dryer which allow various modes of operation for the cleaning of the textile. Thus, the textile can be periodically freed from adhering deposits by a pulse of compressed gas. However, continuous pulsation of the textile with the compressed gas is particularly advantageous. Accordingly, the invention proposes a control unit for valves preceding the outlets by which the valves are intermittently opened and closed, the frequency and pulse duration in particular being variable.

In one particularly advantageous embodiment, the control unit is designed for a frequency of 1 to 10 per minute and for a duration of the opening pulse of 1 to 10 seconds.

In another preferred embodiment, the inner wall of the drying chamber is at least partly divided into segments and each segment is lined with a textile clamped to supports at its edges. The supports may be formed, for example, by narrow battens with rounded edges. With each pulse of compressed air, the textile is briefly inflated and widened towards the interior of the drum. After the pulse of compressed air, the air-permeable textile gradually returns to its original position.

In another preferred embodiment of the invention, at least two outlets for the gas are associated with each textile, being arranged in opposite regions thereof, more particularly in the upper and lower regions thereof. In this way, each textile can be alternately exposed to pulses of the compressed gas from different directions so that the textile is alternately brought into one shape or the other and layers of dried product are prevented from forming locally on the textile. Even if not all parts of the textile are sufficiently moved by the individual pulse of compressed air to remove adhering product, substantially complete cleaning of the textile can be achieved in this way.

In another embodiment of the invention, the throughput can be individually adjusted through the outlets which are designed in particular as nozzles for compressed air.

In one particularly advantageous embodiment of the invention, the outlets are supplied with compressed gas by annular, substantially horizontally extending gas distribution lines which are designed to be individually actuated. This guarantees an adequate volume of gas each time the particular textile receives a pulse of compressed gas.

Although by far the largest amount of deposits and fine dust accumulates on the outside of the textiles and, according to the invention, is blown into the interior of the drying chamber, fine dust can also collect between the textile and the inner wall of the chamber over a period of time. To remove this fine dust during the pulses of compressed gas, vent valves are provided on the outside of the drying chamber in the vicinity of the textile lining.

The present invention also relates to a method of operating a spray dryer of the type described above, preferably for the production of a tacky product or a product with a tendency to agglomerate, more particularly detergents and/or cleaners or components thereof. The hot gas used for this purpose has an entry temperature of up to 300° C. The textile is preferably cleaned by compressed air under a pressure of 4 to 7 bar excess pressure which acts periodically on the textile with a frequency of 1 to 10 per minute and a pulse duration of 1 to 10 seconds.

DESCRIPTION OF THE DRAWINGS

One example of embodiment of the spray dryer according to the invention is described in detail in the following with reference to the accompanying drawings, wherein.

In the drawings, the same reference numerals have the same meanings and, accordingly, may only be explained once.

Figure 1:
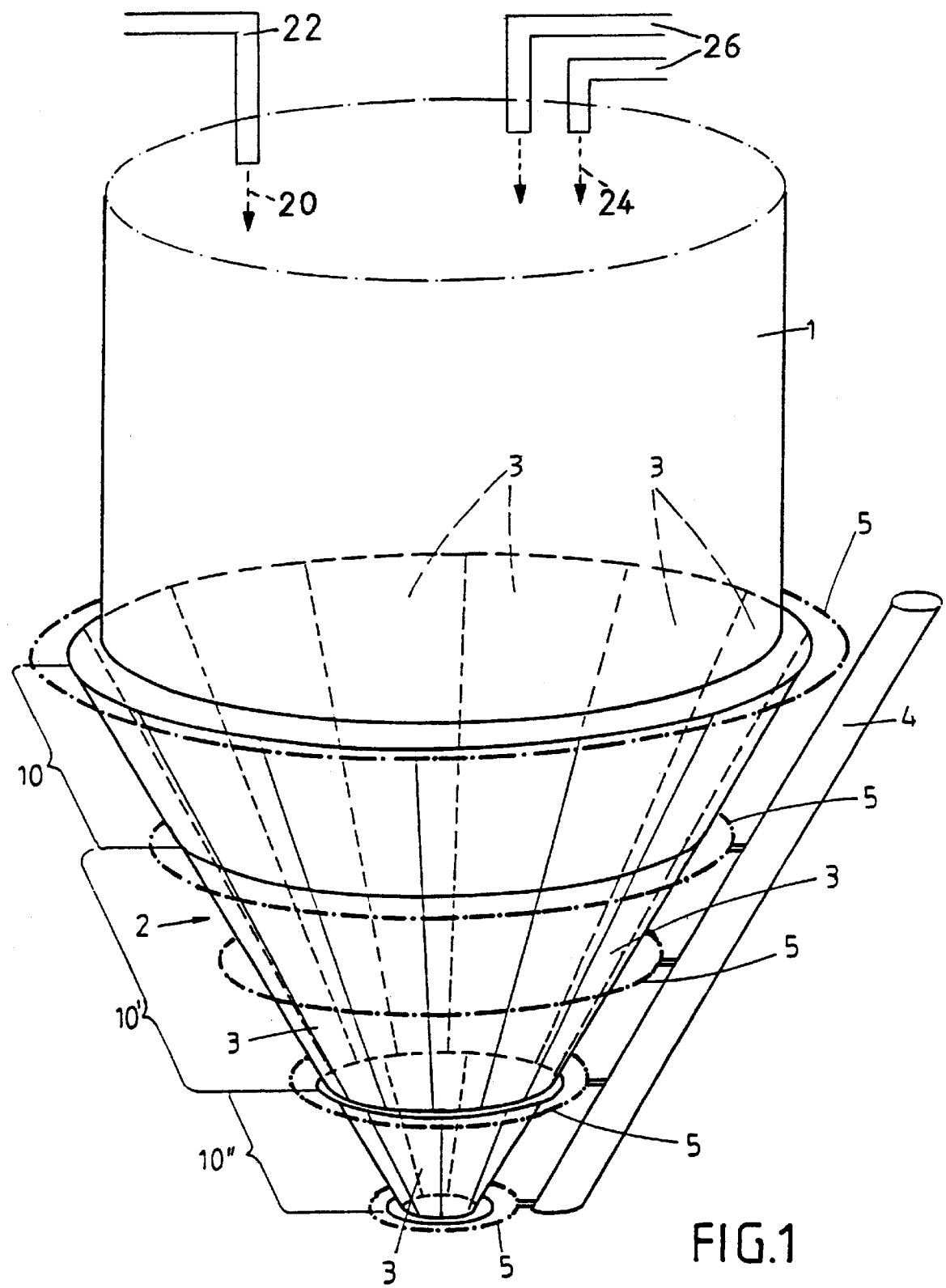
FIG. 1 is a schematic perspective view of the conical part of a spray dryer.

The lower part of a spray dryer shown in FIG. 1 has a cylindrical middle section 1 which tapers conically downwards. A hot drying gas 20 is provided to the spray dryer, above a cone 2 of the spray dryer, with a conventional hot drying gas supply 22. A material to be spray-dried 24 is also provided to the spray dryer, above the cone 2, with conventional spraying elements 26.

In this embodiment, only the cone 2 and not the middle section 1 is lined with the air-permeable textile. The cone 2 is divided into three annular, vertically adjacent layers 10, 10', 10" which, in turn, are peripherally divided into individual segments 3. In the interests of clarity, only a few and not all of the segments are denoted by the reference numeral 3.

In addition, FIG. 1 shows the main supply line 4 for compressed air which supplies five ring lines 5 with compressed air. According to the invention, the compressed air is used to clean the textiles (not shown in FIG. 1) arranged on the inner wall of the cone.

Figure 2:
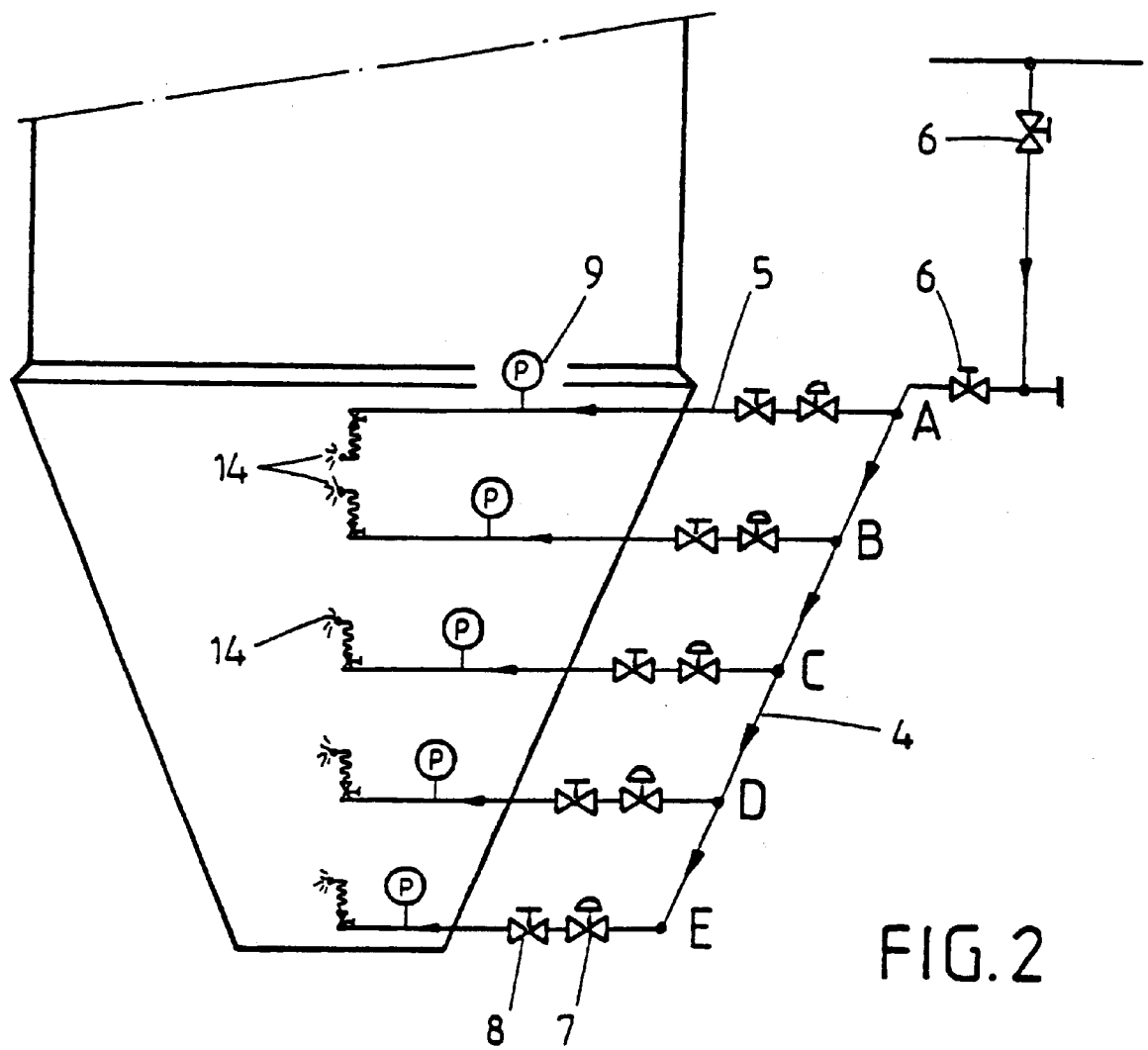
FIG. 2 shows the supply lines for the compressed gas for cleaning the textiles arranged in the conical part.

The delivery of the compressed gas in the conical region of the spray dryer is shown in detail in FIG. 2. The main supply line 4 is supplied from a compressed air source (7 bar) via two shutoff valves 6. The branches from the main supply line 4 to the five ring lines are denoted by the letters A to E. Compressed air is introduced into these ring lines through a magnetic valve 7 operable by a control unit (not shown) and through a shutoff valve 8. Lines lead from each ring line—provided with a pressure gauge 9—to the nozzles 14. For each segment, there is a nozzle arranged in the upper region and a nozzle arranged in the lower region. In the interests of clarity, FIG. 2 shows only one nozzle—rather than the plurality of nozzles—for each ring line 5.

Figure 3:
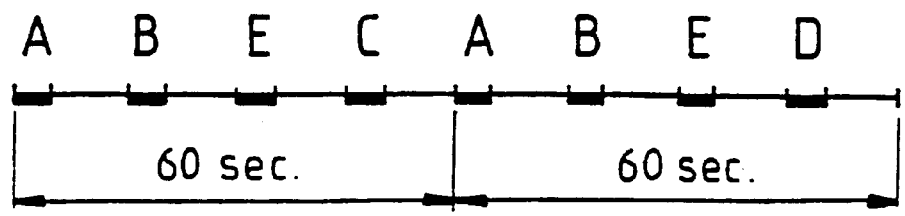
FIG. 3 shows the sequence of compressed gas pulses as a function of time.

The control unit opens and closes the magnetic valves 7 in a certain predetermined rhythm of which one example is shown in FIG. 3. In the boldly marked time intervals of this time scale, the particular magnetic valve 7 is opened; in the thinly drawn time intervals, it is closed. It is essential that the two ring lines supplying the same textiles or segments with compressed air are not opened simultaneously, but alternately. In this way, the textile undergoes a different change in shape with each pulse of compressed air so that even awkwardly situated parts of the textile can be cleaned, i.e. freed from deposits.

Figure 4:
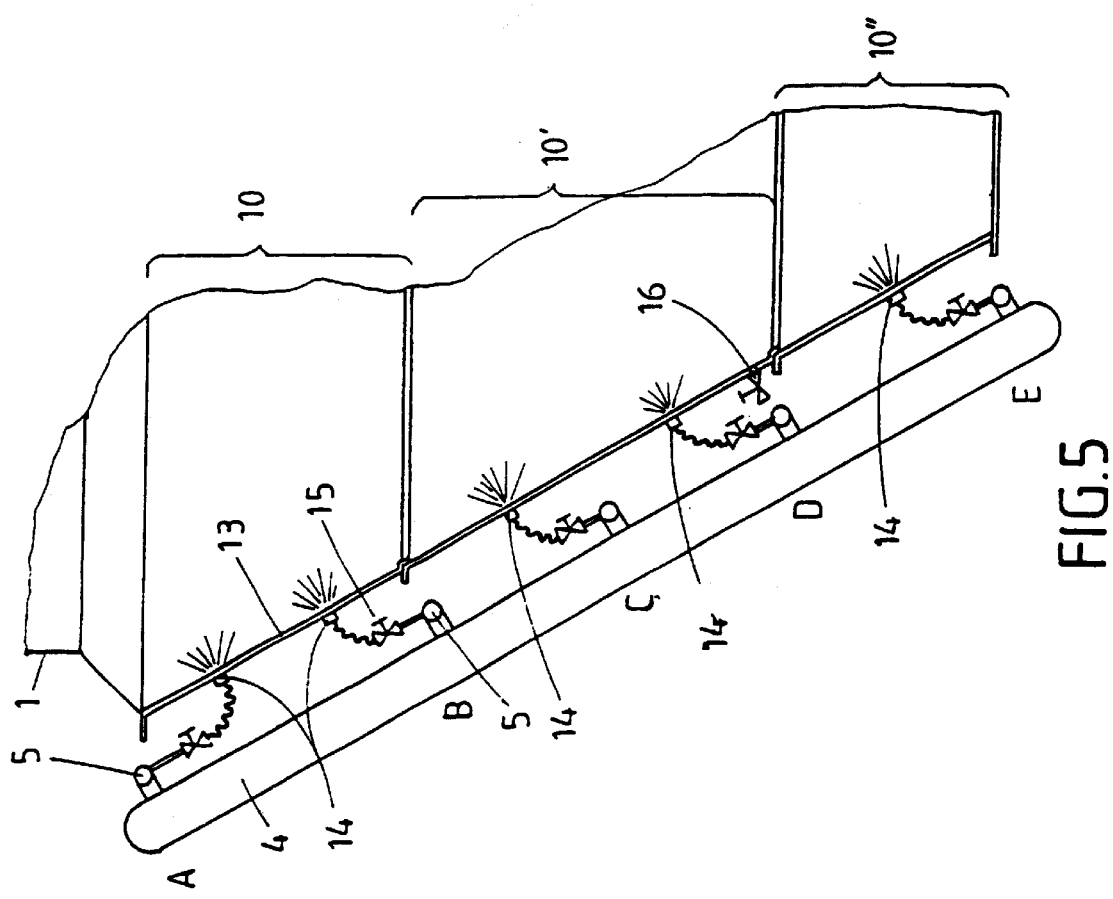
FIG. 4 shows a detail of the cone from inside.
Figure 5:
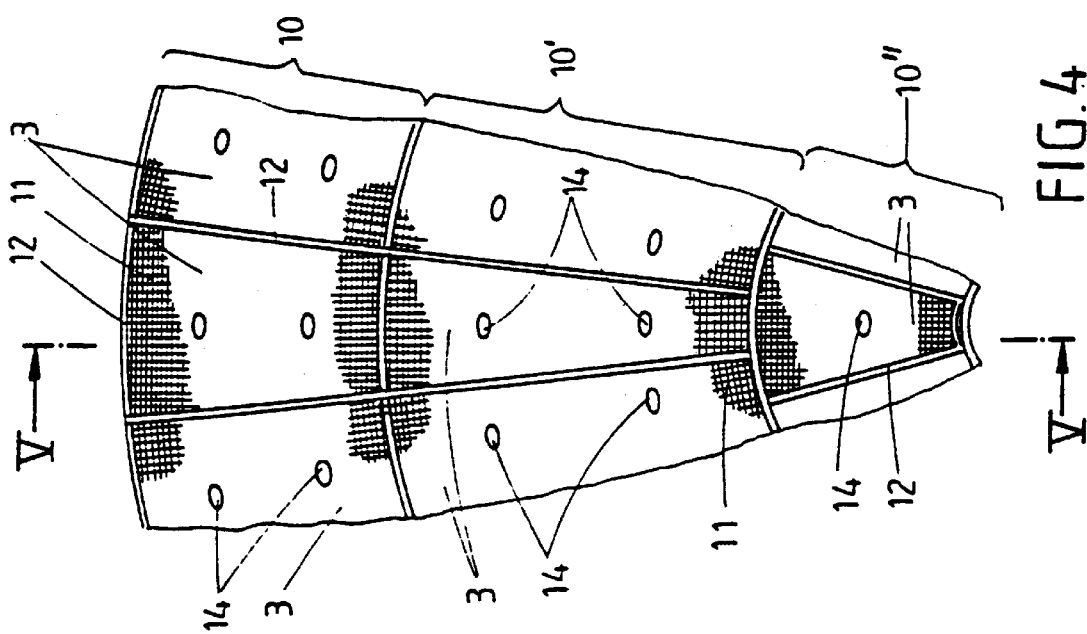
FIG. 5 is a section on the line V—V of FIG. 4.

The arrangements of the textile-lined segments and the compressed-air nozzles with their feed lines are shown in detail in FIGS. 4 and 5. The segments 3 of the three layers 10, 10', 10" are each lined with a textile 11 which consists of a woven aramide cloth or similar material and which is horizontally and vertically clamped by narrow battens 12 with rounded edges. Nozzles 14 arranged on the wall 13 of the cone inject pulses of compressed air into the space between the wall 13 of the cone and the textile 11 at predetermined time intervals.

The segments 3 in the two upper layers 10, 10' are each provided with a nozzle 14 arranged in the upper region and with a nozzle 14 arranged in the lower region. The segments 3 of the lower layer 10" have only one, substantially centrally arranged nozzle 14.

The supply of compressed air to each nozzle can be individually metered or completely interrupted by a control and shutoff valve 15.

FIG. 5 additionally shows a closable vent opening 16 which enables fine dust collecting between the textile 11 and the wall 13 to be blown out at regular intervals.

List of Reference Numerals 1 middle section
2 cone
3 segment
4 main supply line
5 ring line
6 shutoff valve
7 magnetic valve
8 shutoff valve
9 pressure gauge
10 layer
10'layer
10" layer
11 textile
12 batten
13 wall
14 nozzle
15 control and shutoff valve
16 vent opening, vent valve

What is claimed is:

1. A spray dryer for the production of detergents, cleaners, and components thereof, the spray dryer comprising:
   a drying chamber, at least a part of an inner wall of the drying chamber being lined with an air-permeable textile spaced from the inner wall, and at least one outlet intermittently providing compressed gas between and the inner wall of the drying chamber and the textile;
   at least one spraying element for introducing material to be spray-dried into the drying chamber; and
   means for introducing a heated gas into the drying chamber to the spray-dried material.

2. A spray dryer as in claim 1, wherein the lower part of the inner wall of said drying chamber, is lined with said textile.

3. A spray dryer as in claim 1 wherein said drying chamber tapers conically downwards to form a cone section and the cone section is lined with said air-permeable textile.

4. A spray dryer as in claim 1, wherein an outlet for compressed gas is arranged in said drying chamber in at least two horizontal planes and between the inner wall of the drying chamber and the textile, and the inner wall of the drying chamber is lined with said textile in the region between the horizontal planes.

5. A spray dryer as in claim 1 wherein said textile is a woven fabric of high-modulus fibers.

6. A spray dryer as in claim 5 wherein said fibers are selected from polyamide and aramide fibers.

7. A spray dryer as in claim 1 wherein the outlet for compressed gas provides a gas under a pressure of up to 10 bar.

8. A spray dryer as in claim 1 wherein the outlet for compressed gas is equipped with valves and a control unit for said valves to intermittently open and close said valves.

9. A spray dryer as in claim 8 wherein said control unit intermittently opens said valves at a frequency of 1 to 10 times per minute and for a duration of 1 to 10 seconds.

10. A spray dryer as in claim 1, wherein the inner wall of said drying chamber is partly divided into segments, each segment being lined with said textile.

11. A spray dryer as in claim 10 wherein at least two outlets for said compressed gas are associated with each segment lined with said textile and are disposed in opposite regions thereof.

12. A spray dryer as in claim 11 wherein the throughput of said compressed gas can be individually adjusted through said outlets.

13. A spray dryer as in claim 12 wherein said outlets are supplied with compressed gas from annular, substantially horizontally-extending gas distribution lines, the gas distribution lines being individually actuated.

14. A spray dryer as in claim 1 having vent valves on the outside of said drying chamber in the region of the textile lining.

15. A method for preventing the accumulation of sticky deposits on an inner wall of a spray dryer used for the production of detergents, cleaners, and components thereof, the method comprising the steps of:
   lining at least part of an inner wall of a drying chamber of said spray dryer with an air-permeable textile material at a distance from said inner wall; and
   providing at least one outlet for intermittently supplying a compressed gas between said inner wall and said textile.

16. A method as in claim 15 wherein said textile material comprises a woven fabric of high-modulus fibers.

17. A method as in claim 15 wherein said textile material is selected from polyamide and aramide fibers.

18. A method as in claim 15, further comprising the step of introducing a compressed gas, via the outlet for a compressed gas, into said drying chamber between the inner wall of said drying chamber and said textile material whereby sticky deposits formed on said textile material are released therefrom.

19. A method as in claim 18 wherein said compressed gas is introduced under a pressure of up to 10 bar.

20. A method as in claim 18, further comprising the step of providing vent valves on the outside of said drying chamber in the region of the textile lining.

* * * * *